(12) United States Patent
Terashi et al.

(10) Patent No.: US 9,447,478 B2
(45) Date of Patent: Sep. 20, 2016

(54) METHOD FOR RECOVERING TUNGSTEN COMPOUND

(71) Applicant: KYOCERA Corporation, Kyoto (JP)

(72) Inventors: Yoshitake Terashi, Aira (JP); Masahide Akiyama, Kirishima (JP); Takahiko Makino, Satsumasendai (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 106 days.

(21) Appl. No.: 14/396,403

(22) PCT Filed: Apr. 26, 2013

(86) PCT No.: PCT/JP2013/062409
§ 371 (c)(1),
(2) Date: Oct. 23, 2014

(87) PCT Pub. No.: WO2013/151190
PCT Pub. Date: Oct. 10, 2013

(65) Prior Publication Data
US 2015/0329935 A1 Nov. 19, 2015

(30) Foreign Application Priority Data

Apr. 27, 2012 (JP) .................... 2012-102699
Sep. 26, 2012 (JP) .................... 2012-212554
Jan. 23, 2013 (JP) .................... 2013-010269

(51) Int. Cl.
*C22B 3/18* (2006.01)
*C22B 34/36* (2006.01)
(Continued)

(52) U.S. Cl.
CPC .............. *C22B 3/18* (2013.01); *B09B 3/0008* (2013.01); *B09B 3/0033* (2013.01); *B09B 5/00* (2013.01);
(Continued)

(58) Field of Classification Search
None
See application file for complete search history.

(56) References Cited

U.S. PATENT DOCUMENTS

2005/0124765 A1   6/2005   Seko et al.
2007/0202584 A1   8/2007   Ohtsuka et al.

FOREIGN PATENT DOCUMENTS

JP   H03020445 B   3/1991
JP   2004002927 A   1/2004
(Continued)

OTHER PUBLICATIONS

Yuma Sakamoto, Takashi Hagi, Kikuo Okuyama; "Biseibutsu o Mochiita Kinzoku Ion Gan'yu eki no Ekitai Seijo" (Microbial cleaning of metal ion contraining solution), "29 Kai Kuki seijo to contamination control kenkyu taikai yokou shu" (29th Annual tech. Meeting on Air Cleaning and Contamination Control), "Nippon Kuki Seijo gakkai" (Japan Air Cleaning Association), Jun. 5-6, 2012, pp. 191-192, Waseda, Tokyo.
(Continued)

*Primary Examiner* — Melissa Swain

(57) ABSTRACT

[Object] To efficiently recover tungsten from an object containing tungsten by a simple treatment process using a microorganism with reduced environmental load.
[Solution] A method for recovering a tungsten compound is provided which includes the step of preparing a tungsten compound solution in which tungsten-containing polyatomic ions are dissolved, by eluting the metal component of an object containing tungsten into an alkaline solution; the adsorption step of adsorbing the tungsten-containing polyatomic ions to a microorganism by introducing the microorganism to the tungsten compound solution and adjusting the tungsten compound solution to an acidic level; and the collecting and washing step of collecting the microorganism to which the tungsten-containing polyatomic ions are adsorbed and washing the microorganism.

8 Claims, 3 Drawing Sheets

(51) Int. Cl.
*B09B 3/00* (2006.01)
*B09B 5/00* (2006.01)
*C22B 3/12* (2006.01)
*C02F 1/28* (2006.01)
*C02F 3/34* (2006.01)
*C22B 3/24* (2006.01)
*C22B 7/00* (2006.01)
*C02F 1/00* (2006.01)
*C02F 1/38* (2006.01)
*C02F 101/10* (2006.01)

(52) U.S. Cl.
CPC .............. *C02F 1/286* (2013.01); *C02F 3/34* (2013.01); *C22B 3/12* (2013.01); *C22B 3/24* (2013.01); *C22B 7/006* (2013.01); *C22B 34/36* (2013.01); *B01J 2220/4868* (2013.01); *C02F 1/001* (2013.01); *C02F 1/385* (2013.01); *C02F 2101/10* (2013.01); *Y02P 10/234* (2015.11); *Y02P 10/238* (2015.11)

(56) References Cited

FOREIGN PATENT DOCUMENTS

| JP | 2005152756 A | 6/2005 |
| JP | 2007228960 A | 9/2007 |
| JP | 2010202892 A * | 9/2010 |
| JP | 2011047013 A | 3/2011 |
| JP | 2011179038 A | 9/2011 |

OTHER PUBLICATIONS

International Search Report mailed on Aug. 6, 2013 for Internatinal application No. PCT/JP2013/062409 filed Apr. 26, 2013.
Takashi Nishitani et al., Molecular design of yeast cell surface for adsorption and recovery of molybdenum, one of rare metals, Applied Genetics and Molecular Biotechnology, Nov. 6, 2009, 86, p. 641-648.
Koichi Kuroda et al,. Creation of rare metals adsorption and recovery yeast on which selective adsorption capacity is conferred by the protein molecular alteration, Conference of the Japan Society for Bioscience, Biotechnology and Agrochemistry, Conference Lectures, Mar. 5, 2010, vol. 2010, 130, Japan.
Concise explanation of the office action issued in the corresponding Japanese patent application No. 2014-509233 dated Sep. 1, 2015.
Fereydoon Malekzadeh et al., Biosorption of tungstate by a *Bacillus* sp. isolated from Anzali lagoon, World Journal of Microbiology and Biotechnology, Kluwer Academic Publishers, DO, vol. 23, No. 7, Jan. 4, 2007, pp. 305-910.
European Search Report issued in the corresponding European patent application No. 13772290.6 dated Nov. 25, 2015, 6pages.

* cited by examiner

METHOD FOR RECOVERING TUNGSTEN COMPOUND

RELATED APPLICATION

The present application is a national stage entry according to 35 U.S.C. §371 of PCT application No.: PCT/JP2013/062409 filed on Apr. 26, 2013, which claims priority from Japanese application Nos.: JP2012-102699 filed on Apr. 27, 2012, JP2012-212554 filed on Sep. 26, 2012, and JP2013-010269 filed on Jan. 23, 2013 and is incorporated herein by reference in its entirety.

TECHNICAL FIELD

Various embodiments relate to a method for recovering a tungsten compound in which the tungsten component in an object containing tungsten, such as a carbide tool, is efficiently recovered by a simple treatment process.

BACKGROUND

Cemented carbides, which are often used in cutting tools according to their super hard nature, contain expensive rare elements such as tungsten, cobalt, tantalum, and niobium. These elements are desired to be recovered as much as possible from scrap.

The methods for recycling scrap of carbide tools are broadly classified into two groups: direct methods in which solid scrap is recycled into powder with the composition maintained; and indirect methods in which scrap is chemically dissolved and then the constituents are each separately recovered.

A typical example of the direct methods is zinc treatment (see, for example, Japanese Examined Patent Application Publication No. 03-020445). This method allows zinc, as well as rare elements, to be recovered and recycled without using chemicals or aqueous solutions and is superior in low energy consumption. Also, this method does not require large investment for treating equipment and is thus advantageous in small-scale industrial production. The direct method, however, requires strict pre-screening because the composition of scrap is kept even after recovery. This increases screening cost and cancels the benefit in terms of process cost. In addition, in recovery of cutting tools that account for a major part of production, the constituents of the coatings of the cutting tools are also collected at the same time. This is a cause of degradation in quality of recycled materials. Accordingly, such a recycled material is limited in use and, for example, must be mixed in a virgin powder before use. This is a large problem. It is an issue to develop applications in which the recycled materials can be used in a wide range.

In wet chemical treatment that is an indirect method, the step of recycling scrap is generally performed in an ore refining process (see, for example, Japanese Unexamined Patent Application Publication No. 2004-002927). For cemented carbide scrap, which mainly contain WC and Co, an aqueous solution of $Na_2WO_4$ is prepared by alkaline extraction or alkaline dissolution, and impurities other than tungsten such as Co, Ti, Ta, Nb, Cr, and V, which have been added to the cemented carbide as additive elements, are removed by being precipitated as insoluble compounds by pH adjustment or sulfuration, and filtering out the insoluble compounds, as shown in FIG. 3. Tungsten is separated and extracted from the filtered $Na_2WO_4$ aqueous solution. To the tungsten, ammonia is added, and ammonium paratungstate (APT) is crystallized by heating and concentration. The APT is purified into tungsten oxide by pyrolysis.

Alkaline extraction is a method for extraction from previously oxidized and roasted scrap using a NaOH solution, or an alkaline solution, and is suitable for treating powdery soft scrap such as grinding sludge. On the other hand, alkaline dissolution is a method performed by simultaneously oxidizing and dissolving scrap using a molten sodium salt such as $NaNO_3$, $Na_2SO_4$, or $Na_2CO_3$, and is suitable for treating solid hard scrap.

A known method for obtaining, for example, tungsten oxide using alkaline dissolution is performed in the following process:

(1) $Na_2WO_4$ prepared by dissolution in a molten salt is dissolved in water to yield a $Na_2WO_4$ aqueous solution. In an ore refining process, $SiO_2$, As, P, Mo, and other impurities contained in ore are dissolved in this step. These are removed by being precipitated by pH adjustment or sulfuration and filtered out. For recycling waste carbide tools, impurities other than tungsten such as Co, Ti, Ta, Nb, Cr, and V which have been added to cemented carbide as additive elements are removed by being precipitated as insoluble compounds by pH adjustment or sulfuration, and filtering out the insoluble compounds.

(2) To the $Na_2WO_4$ solution, $CaCl_2$ is added to precipitate $CaWO_4$, and the $CaWO_4$ slurry is rinsed with water to remove the Na component.

(3) To the $CaWO_4$ slurry, HCl is added to precipitate tungstic acid ($H_2WO_4$), and the $H_2WO_4$ slurry is rinsed with water to remove Ca ion.

(4) To the $H_2WO_4$, $NH_4OH$ is added to prepare a $(NH_4)_2WO_4$ aqueous solution.

(5) The resulting solution is heated and concentrated to crystallize ammonium paratungstate (APT).

(6) The APT is pyrolyzed into tungsten oxide ($WO_3$).

For converting the $Na_2WO_4$ aqueous solution into a $(NH_4)_2WO_4$ aqueous solution, alternatively, solvent extraction or ion exchange may be performed.

Unlike zinc treatment, wet chemical treatment can achieve high-quality recovery comparable to ore refining and is therefore advantageous in allowing recycled tungsten to be reused without limitation.

SUMMARY

Technical Problem

In the known method, however, the step of chemically refining tungsten from a $Na_2WO_4$ aqueous solution requires large amounts of chemicals, water and ion-exchange resin. Also, the known method includes a large number of steps including complicated steps, thus disadvantageous in terms of environmental load and energy consumption. In addition, a large amount of waste water is produced. Thus, the known method undesirably requires large scale equipment for waste water treatment and an additional step for recycling the ion-exchange resin.

The present disclosure is intended to solve the above-described problems of the known wet chemical treatment. It is an object of the present disclosure to provide a method for efficiently recovering a tungsten compound from an object containing tungsten, such as a carbide tool, by a simple treatment process using a microorganism with reduced environmental load.

Solution to Problem

The method for recovering a tungsten compound of the present disclosure includes the steps of preparing a tungsten solution in which tungsten-containing polyatomic ions are dissolved, by eluting the metal component of an object containing tungsten into an alkaline solution; adsorbing the tungsten-containing polyatomic ions to a microorganism by introducing the microorganism to the tungsten solution and adjusting the pH of the tungsten solution to an acidic level; and collecting the microorganism to which the tungsten-containing polyatomic ions are adsorbed and washing the microorganism.

Advantageous Effects of Invention

According to the method for recovering a tungsten compound of the present disclosure, tungsten can be efficiently recovered from an object containing a tungsten compound, such as carbide tools, by a simple treatment process using a microorganism with reduced environmental load.

DETAILED DESCRIPTION

First Embodiment

Figure 1:
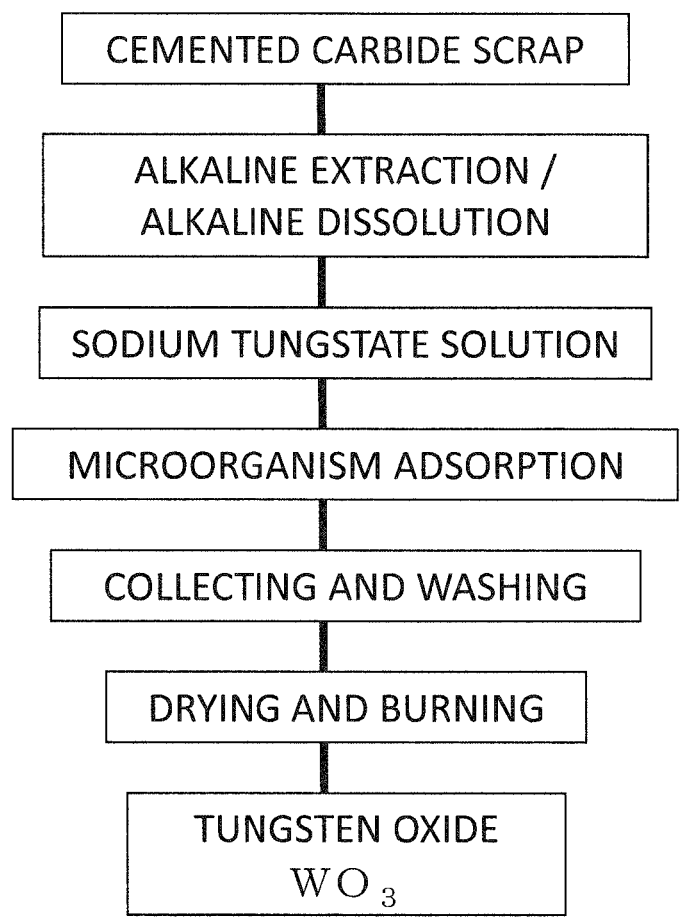
FIG. 1 is a general flow chart of a method for recovering a tungsten compound according to a first embodiment of the present disclosure.

As a first embodiment of the present disclosure, a method for recovering tungsten oxide from cemented carbide scrap will be described with reference to FIG. 1. Cemented carbide scrap include scrap produced in manufacturing processes of carbide tools using cemented carbide mainly containing metal tungsten, tungsten carbide (WC) or the like, hard scrap, such as used tools, and powdery soft scrap, such as grinding sludge. In general, carbide tools are made of cemented carbide containing a main phase of metal tungsten, tungsten carbide or a complex carbide and a bonded phase of iron, nickel, cobalt, copper or the like, and, optically, additive components such as TiC, TaC, NbC, VC, or $Cr_3O_2$. Examples of carbide tools include cutting tools (tips, drills, end mills, etc.), dies (forming rolls, shaping dies, etc.), and tools for civil engineering and mining (tools for oil-well drilling, tools for rock grinding, etc.)

First, the metal component of such cemented carbide scrap is eluted into an alkaline solution to yield a tungsten compound solution in which tungsten-containing polyatomic ions are dissolved. For this operation, previously oxidized and roasted scrap may be subjected to alkaline extraction with, for example, a NaOH aqueous solution, or the scrap may be subjected to alkaline dissolution for simultaneous oxidation and dissolution in a molten sodium salt such as $NaNO_3$, $Na_2SO_4$, or $Na_2CO_3$. For example, soft scrap, which is highly reactive and difficult to control, is preferably treated by alkaline extraction. For hard scrap, alkaline dissolution is suitable because oxidizing roasting treatment merely oxidizes only the surface of hard scrap.

A microorganism is introduced into the resulting tungsten compound solution. Examples of the microorganism include bacteria, such as *E. coli* (*Escherichia coli*), *Bacillus* sp, *Thiobacillus ferrooxidans*, *Streptomyces rimosus*, *Pseudomonas* sp, *Arthrobacter nicotianae*, *Shewanella* algae, and *Shewanella oneidensis*; and *Saccharomyces cerevisiae, Schizosaccharomyces pombe, Candida albicans, Yarrowia lipolytica, Pichia pastoris, Hansenula polymorpha, Kluyveromyces lactis*, and other yeast contained in sake lees and shochu distillery by-product. In particular, the use of sake lees and shochu distillery by-product, which are waste from manufacturing processes of alcohol beverages or the like, means effective utilization of resources, and, in addition, leads to low-cost recovery of tungsten because they can be inexpensively obtained and is easy to manage.

For example, *E. coli* (colon *bacillus*) or any other microorganism is introduced to a concentration of $1 \times 10^{14}$ to $1 \times 10^{17}$ cells/m$^3$ to a tungsten compound solution in which the tungsten concentration has been adjusted to 0.1 to 10 mmol/L. The temperature is adjusted according to the microorganism activity temperature and, normally, may be room temperature. The tungsten compound solution to which the microorganism has been introduced is adjusted to an acidic pH with hydrochloric acid or the like so that the anionic tungsten-containing polyatomic ions are adsorbed to the surface of the microorganism (adsorption step).

The results of an experiment in the present embodiment have showed that yeast contained in, for example, shochu distillery by-product can adsorb tungsten by a reaction in a shorter time than bacteria such as *E. coli* and increase the amount of tungsten that will be adsorbed to one cell of the microorganism. Accordingly, yeast has a higher recovery efficiency than bacteria.

In the present embodiment, the microorganism may be concentrated before being added. In particular, after being cultured, the microorganism may be dried into powder, and then added to the tungsten compound solution. The results of an experiment have shown that the amount of tungsten that can be adsorbed to one cell of the microorganism, that is, the amount of equilibrium adsorption, is increased by concentrating or powdering the microorganism. The term equilibrium adsorption (qe: mmol/g) refers to the amount of adsorbed molecules when the molecules come to equilibrium.

Since the concentrated microorganism or the microorganism in powder does not require a large-volume tank for being stored, the storage thereof can be easy and can allow for the case where the amount of the object to be treated is increased.

Next, the microorganism to which tungsten-containing polyatomic ions are adsorbed is dehydrated by centrifugation or any other means and then rinsed with pure water or the like to remove impurities (collecting and washing step). Thus, a tungsten compound can be easily concentrated. Then, the microorganism to which the tungsten-containing polyatomic ions are adsorbed is burned at a temperature of 300° C. or more in, for example, the air. Thus, the tungsten compound is oxidized to yield tungsten oxide. Alternatively, the tungsten compound may be reduced and carbonized into tungsten carbide by being heat-treated at a temperature of 500° C. or more in a reducing atmosphere.

Thus, the present embodiment employs adsorption using a microorganism (biosorption) instead of the step of separating and extracting tungsten performed by solvent extraction requiring many steps and a large amount of chemicals or by ion exchange requiring an elution step and a resin recycling step, and the subsequent step of preparing APT, consequently reducing the number of steps. In addition, since the amount of chemicals used and the amount of waste are small in this method, a tungsten compound can be recovered at low cost. In particular, yeast can be inexpensively obtained from waste from manufacturing processes of alcohol beverages or the like and is easy to manage. By using yeast as the microorganism, a low-cost tungsten recovery process can be achieved.

Preferably, the pH of the tungsten compound solution is adjusted to 4 or less, preferably 1 to 3, in the adsorption step. Thus the recovery rate of the tungsten compound can be advantageously increased. For example, when $E.\ coli$ is used as the microorganism, the pH is adjusted to 1 to 3; when yeast is used, the pH is adjusted to 1 to 4.

In the present embodiment, in a method for recovering tungsten through an oxidizing and roasting step and an extraction step, using WC—Co-based alloy scrap as cemented carbide scrap, the WC is converted by oxidizing and roasting into a form that can be eluted into an alkaline solution when the metal component is eluted into the alkaline solution. The WC and Co in the WC—Co-based alloy scrap are converted into $CoWO_4$ and $WO_3$ by oxidizing and roasting. At this time, in the present embodiment, a magnet can be used to examine how much the cemented carbide scrap has been roasted. More specifically, if the roasted material is not drawn to the magnet, it can be determined that no or little Co is present in the material, and that the entirety or almost all the Co has been oxidized by roasting. If the roasted material is drawn to the magnet, a certain amount of Co is present in the material, and that part of the Co remains as an unroasted portion in the material. Thus, the roasted material can be divided into a roasted portion and an unroasted portion by the degree of oxidation.

This technique facilitates the estimation of how much the roasted material is oxidized, which is not easy in visual observation, and the separation between the roasted portion and the unroasted portion. In addition, this separation technique reduces the amount of unroasted portion sent to the subsequent alkaline extraction step. Accordingly, the reaction chamber can be prevented from being damaged and degraded by the unroasted portion. Also, since the unroasted portion is not collected and thus decreases in amount, the recovery rate of W can be increased. Furthermore, although the unroasted portion needs to be filtered out in the subsequent alkaline extraction, the time required for this filtration can be reduced, and the capacity of the roasting apparatus can be reduced because only the unroasted portion separated out can be re-roasted.

For separating the roasted portion and the unroasted portion with a magnet, a magnetic force is applied to the roasted material after the roasting step in a container or on a conveying belt. This separation and the subsequent collection can be automated. The magnet may be a permanent magnet or an electromagnet. Electromagnets can produce higher magnetic force and, accordingly, allow the tungsten recovery apparatus to be downsized. Furthermore, the container in which the roasted material is placed may be made of an electromagnet. The roasted material is placed in the electromagnet container, and electricity is applied to the container to draw the unroasted portion. The roasted portion not drawn to the container is taken out, and then, the unroasted portion is taken out with the electricity to the electromagnet interrupted. The roasted portion and the unroasted portion thus can be easily separated. In another case using a magnet, a magnet may be attached to the roasted material discharge port of a rotary kiln apparatus. When the roasted material is discharged, the unroasted portion is drawn to the magnet while the roasted portion not drawn is taken out. Thus, the roasted portion and the unroasted portion are separated, and then, the unroasted portion is returned to the rotary kiln apparatus after the electricity to the magnet is interrupted. This can increase work efficiency.

Second Embodiment

Figure 2:
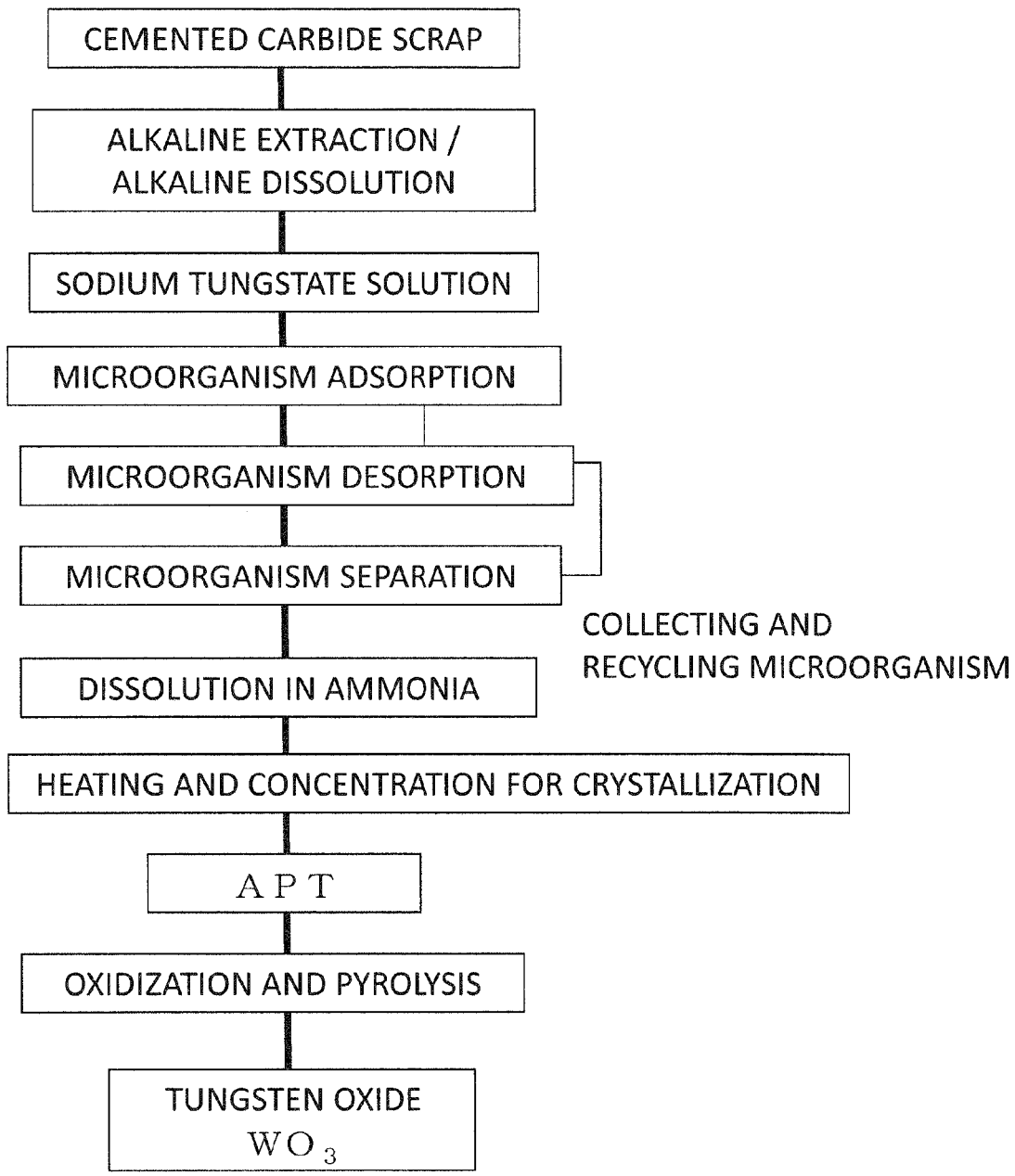
FIG. 2 is a general flow chart of a method for recovering a tungsten compound according to a second embodiment of the present disclosure.
Figure 3:
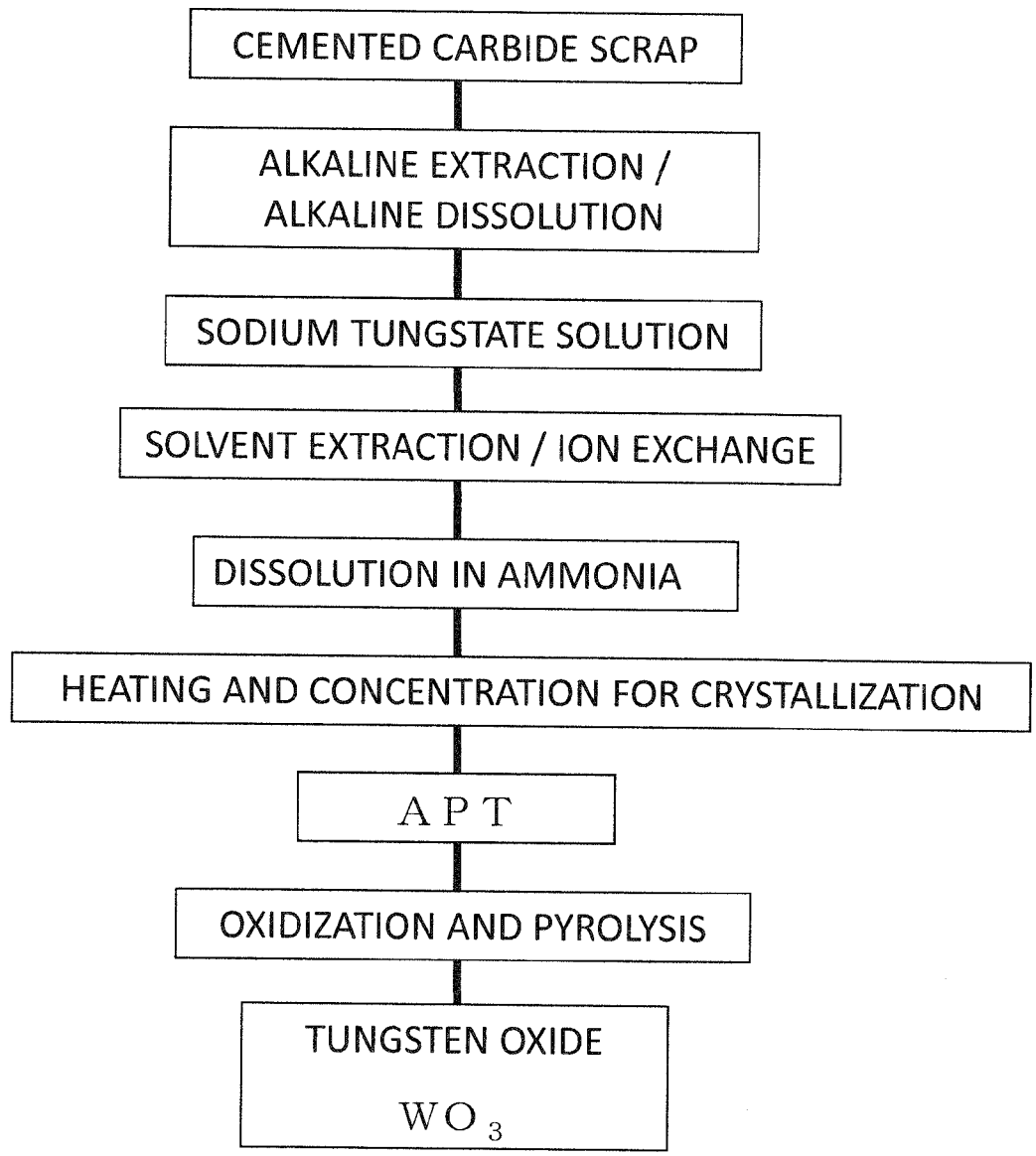
FIG. 3 is a general flow chart of a known method for recovering a tungsten compound.

As a second embodiment of the present disclosure, a method for recovering tungsten oxide from cemented carbide scrap will be described with reference to FIG. 2.

A large difference from the first embodiment is that the microorganism introduced is collected and recycled. First, as in the first embodiment, the metal component of the cemented carbide scrap is eluted into an alkaline solution to yield a tungsten compound solution in which tungsten-containing polyatomic ions are dissolved. To this solution, the above-described microorganism such as bacteria or yeast is introduced, and the resulting solution is adjusted to an acidic pH with hydrochloric acid or the like so that the tungsten-containing polyatomic ions are adsorbed to the surface of the microorganism (adsorption step).

Next, the microorganism to which tungsten-containing polyatomic ions are adsorbed is dehydrated while impurities are being removed, by centrifugation or any other means (collecting and washing step). Thus, the microorganism to which the tungsten-containing polyatomic ions are adsorbed is concentrated. Then, a desorbing liquid such as pure water is added to the concentrated microorganism to which the tungsten-containing polyatomic ions are adsorbed, thus preparing a suspension. To this suspension $NH_4Cl$ or any other ammonia solution is added to adjust the pH to a neutral or alkaline level. By adjusting the suspension to a neutral or alkaline level, for example, to a pH of 7 or more, the tungsten-containing polyatomic ions are desorbed to the desorbing liquid from the microorganism. At this time, by adjusting the suspension to a pH of 10 or more, 80% or more of the tungsten-containing polyatomic ions can be desorbed from the microorganism within 3 minutes.

Subsequently, the suspension containing the microorganism and the tungsten-containing polyatomic ions desorbed from the microorganism is subjected to centrifugation or filtration to separate the microorganism and the desorbing liquid containing the tungsten-containing polyatomic ions.

Then, the desorbing liquid containing the tungsten-containing polyatomic ions is heated and concentrated to crystallize ammonium paratungstate (APT). Then, the ATP is pyrolyzed to be oxidized into tungsten oxide. The resulting tungsten oxide may be carbonized by heat treatment in a reducing atmosphere, thereby yielding tungsten carbide.

Thus, the second embodiment employs adsorption using a microorganism (biosorption) and desorption, instead of the step of separating and extracting tungsten performed by solvent extraction requiring many steps and a large amount of chemicals or by ion exchange requiring an elution step and a resin recycling step, consequently reducing the number of steps. In addition, since the amount of chemicals used and the amount of waste are small in this method, a tungsten compound can be recovered at low cost. In addition, the second embodiment allows the microorganism to be recycled. Accordingly, the cost of disposing of the microorganism is not required, and the cost of obtaining (culturing) microorganisms and the need for a large amount of storage can be reduced.

Example 1

A used cemented carbide cutting insert was crushed and subsequently oxidized and roasted. The resulting roasted material was dissolved in an alkaline solution (NaOH solution). Thus tungsten compound solutions were prepared, each in which tungsten-containing polyatomic ions were dissolved with the tungsten concentration shown in Table 1.

Each tungsten compound solution was adjusted to a temperature and a pH shown in Table 1. Then, *E. coli* in a form shown in Table 1 was added to the tungsten compound solution to a concentration shown in Table 1, and the solution was stirred.

The tungsten concentration in the solution was measured 3 minutes and 60 minutes after the *E. coli* had been introduced. The percentage of decrease in tungsten concentration relative to the tungsten concentration before the microorganism had been introduced (tungsten concentration in the solution before introduction of microorganism−tungsten concentration in the solution after introduction of microorganism)/tungsten concentration before introduction of microorganism×100) (%) was estimated as the recovery rate of tungsten (W) adsorbed to the *E. coli*. The results are shown in Table 1.

TABLE 1

| Sample No | W concentration (mmol/l) | temperature (° C.) | pH | Form of microorganism added | Microorganism concentration (cells/m³) | W recovery rate after 3 min (%) | W recovery rate after 60 min (%) |
|---|---|---|---|---|---|---|---|
| I-1 | 0.1 | 23 | 2.0 | Solution | 6*10¹⁵ | 100 | 100 |
| I-2 | 0.5 | 23 | 2.0 | Solution | 6*10¹⁵ | 60 | 100 |
| I-3 | 1.0 | 23 | 2.0 | Solution | 6*10¹⁵ | 40 | 80 |
| I-4 | 1.4 | 23 | 2.0 | Solution | 6*10¹⁵ | 30 | 60 |
| I-5 | 0.5 | 23 | 2.0 | Solution | 7*10¹⁴ | 7 | 49 |
| I-6 | 0.5 | 23 | 2.0 | Solution | 1*10¹⁵ | 13 | 75 |
| I-7 | 0.5 | 23 | 2.0 | Solution | 6*10¹⁵ | 56 | 95 |
| I-8 | 0.5 | 23 | 1 | Solution | 6*10¹⁵ | 60 | 87 |
| I-9 | 0.5 | 23 | 1.4 | Solution | 6*10¹⁵ | 60 | 90 |
| I-10 | 0.5 | 23 | 4.6 | Solution | 6*10¹⁵ | 3 | 10 |
| I-11 | 0.5 | 23 | 5.7 | Solution | 6*10¹⁵ | 1 | 1 |
| I-12 | 0.5 | 23 | 7.1 | Solution | 6*10¹⁵ | 0 | 0 |
| I-13 | 1.0 | 32 | 2.0 | Solution | 6*10¹⁵ | 33 | 56 |
| I-14 | 1.0 | 40 | 2.0 | Solution | 7*10¹⁴ | 61 | 73 |
| I-15 | 1.0 | 53 | 2.0 | Solution | 8*10¹⁴ | 68 | 84 |
| I-16 | 1.4 | 23 | 2.0 | Powder | 6*10¹⁵ | 55 | 100 |

The results in Table 1, other than the results of Sample No. 1-12 in which *E. coli* was added to a neutralized tungsten compound solution, clearly show that the tungsten concentration of the tungsten compound solution was reduced by adding *E. coli*, and that *E. coli* adsorbed tungsten.

Example 2

Tungsten compound solutions each having a concentration and pH shown in Table 2 were prepared in the same manner as in Example 1. Then, shochu distillery by-product in a form shown in Table 2 containing yeast with a microorganism concentration of 7×10¹⁴ cells/m³ was added at 23° C. to each solution, and the resulting solution was stirred. The tungsten concentration in the solution was measured 3 minutes and 60 minutes after the shochu distillery by-product had been introduced. The percentage of decrease in tungsten concentration relative to the tungsten concentration before the microorganism had been introduced was estimated as the recovery rate of tungsten (W) adsorbed to the shochu distillery by-product. The results are shown in Table 2.

TABLE 2

| Sample No | W concentration (mmol/l) | pH | Form of microorganism added | W recovery rate after 3 min (%) | W recovery rate after 60 min (%) |
|---|---|---|---|---|---|
| II-1 | 2.0 | 1.9 | Solution | 89 | 89 |
| II-2 | 0.8 | 1.9 | Solution | 95 | 93 |
| II-3 | 3.0 | 1.9 | Solution | 79 | 86 |
| II-4 | 15.0 | 1.9 | Solution | 24 | 41 |
| II-5 | 60.0 | 1.9 | Solution | 19 | 26 |
| II-6 | 0.8 | 1.1 | Solution | 85 | 83 |
| II-7 | 0.8 | 1.4 | Solution | 90 | 88 |
| II-8 | 0.8 | 2.4 | Solution | 96 | 95 |
| II-9 | 0.8 | 6.0 | Solution | 25 | 33 |
| II-10 | 3.0 | 2.0 | Powder | 50 | 90 |

The results in Table 2 clearly show that the tungsten concentration of the tungsten compound solution was reduced by adding shochu distillery by-product, and that shochu distillery by-product adsorbed tungsten. Comparison between the results of Tables 1 and 2 suggests that shochu distillery by-product of Example 2 can adsorb tungsten from a tungsten compound solution with a high tungsten concentration in a shorter time even though the concentration of the microorganism added is lower, and thus can recover tungsten.

The invention claimed is:

1. A method for recovering a tungsten compound, the method comprising:
   preparing a tungsten compound solution in which tungsten-containing polyatomic ions are dissolved by eluting a metal component of an object containing tungsten into an alkaline solution;
   adsorbing the tungsten-containing polyatomic ions to a microorganism by introducing the microorganism to the tungsten compound solution and adjusting the pH of the tungsten compound solution to an acidic level; and
   collecting the microorganism to which the tungsten-containing polyatomic ions are adsorbed and washing the microorganism,
   wherein the microorganism is yeast.

2. The method for recovering a tungsten compound according to claim 1, wherein in the absorbing, the pH of the tungsten compound solution is adjusted to 1 to 4.

3. The method for recovering a tungsten compound according to claim 1, wherein the tungsten compound is tungsten oxide.

4. The method for recovering a tungsten compound according to claim 1, wherein the object containing tungsten is cemented carbide.

5. The method for recovering a tungsten compound according to claim 1, wherein the microorganism is introduced in a form of powder.

6. The method for recovering a tungsten compound according to claim 1, further comprising drying and heat-treating the collected microorganism to yield a tungsten compound after the collecting and washing.

7. The method for recovering a tungsten compound according to claim 1, further comprising:
   desorbing the tungsten-containing polyatomic ions from the microorganism by introducing the microorganism to a desorbing liquid and adjusting the desorbing liquid to a neutral or alkaline pH, after the collecting and washing step; and separating the microorganism from the desorbing liquid and pyrolyzing the tungsten-containing polyatomic ions in the desorbing liquid to yield a tungsten compound.

8. The method for recovering a tungsten compound according to claim 6, further comprising reducing the tungsten compound.

* * * * *